Nov. 3, 1931.  A. DINA  1,830,596

ADJUSTABLE MOUNTING FOR PICTURE PROJECTION APPARATUS

Filed Feb. 29, 1928    5 Sheets-Sheet 1

Inventor
Augusto Dina
By his Attorney
Howard W. Dix

Nov. 3, 1931.  A. DINA  1,830,596
ADJUSTABLE MOUNTING FOR PICTURE PROJECTION APPARATUS
Filed Feb. 29, 1928   5 Sheets-Sheet 3

Inventor
Augusto Dina
By his Attorney
Howard W. Dix

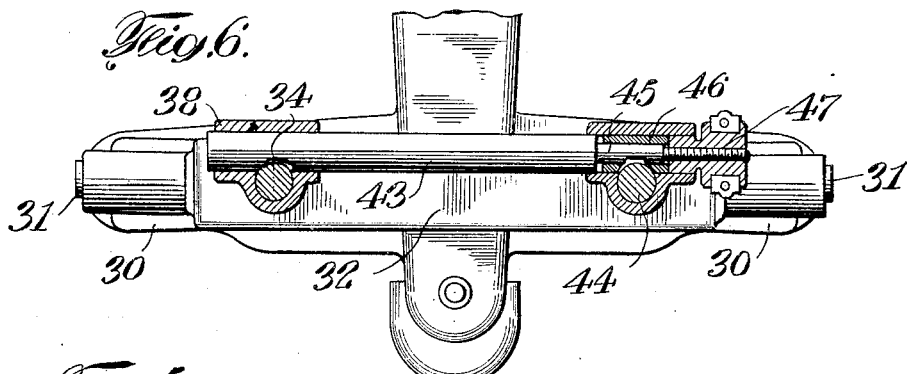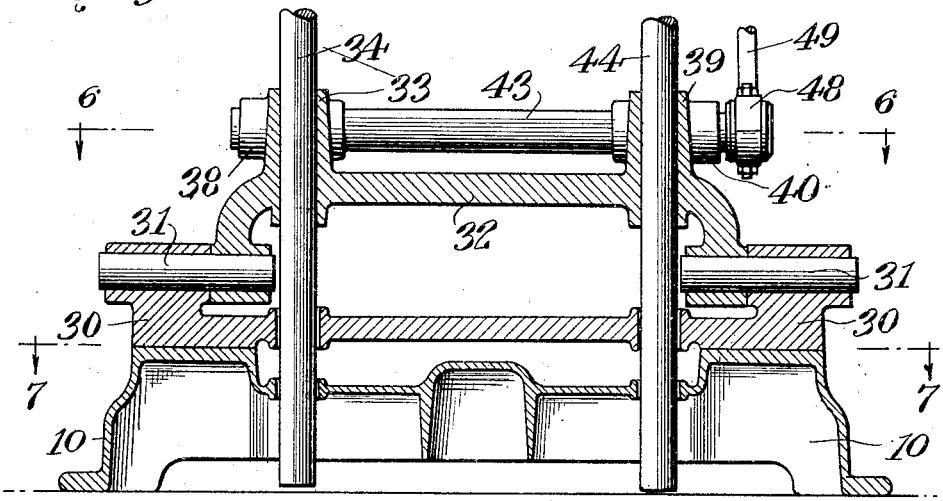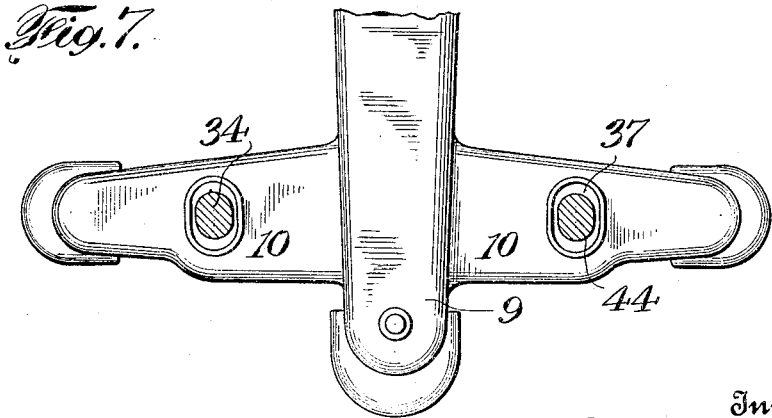

Nov. 3, 1931.  A. DINA  1,830,596
ADJUSTABLE MOUNTING FOR PICTURE PROJECTION APPARATUS
Filed Feb. 29, 1928   5 Sheets-Sheet 5

INVENTOR.
Augusto Dina
BY Howard W. Dix
ATTORNEYS.

Patented Nov. 3, 1931

1,830,596

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

ADJUSTABLE MOUNTING FOR PICTURE PROJECTION APPARATUS

Application filed February 29, 1928. Serial No. 257,831.

The invention relates in general to picture projection apparatus, and more particularly, to an adjustable support for picture projecting apparatus and the like, having extreme rigidity and great ease of adjustment.

Motion picture machines are usually operated in such position that the line of projection extends forwardly and slightly downwardly. Furthermore, it is desirable that the same machine be used for projecting both the motion pictures and still pictures. Motion picture machines comprise generally a lamp house having a source of illumination and a projection head in which the film-moving apparatus is mounted. For motion picture projection it is desirable that the lamp house and projection head be in line, while for still picture projection it is desirable that the lamp house be movable laterally so that light may be projected clear of the projection head. Furthermore, it is desirable that the parts be mounted so that they are self-balancing as nearly as possible and that they may be moved with ease and yet have extreme rigidity when adjusted for operation.

According to the invention a mounting for picture projection apparatus is provided in which the above characteristics are attained in a simple and efficient manner. In one embodiment of the invention, the plate for supporting the projection head is pivoted to the top of the pedestal. The plate for the lamp house is mounted behind the projection head plate and secured thereto by a pantograph arrangement to insure continuous parallel relation between the axis of the projection head and of the lamp house for both still and motion picture projection. Furthermore an adjustable bracing device is provided to connect the base of the pedestal and the lamp house plate, which allows lateral shifting of the lamp house as well as adjustment of the angle of projection and also aids in imparting extreme rigidity to the entire mounting structure during operation of the machine.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a side elevation of a motion picture projecting apparatus embodying the invention;

Fig. 5 is a section on the line 5—5 of Fig. 1;

Fig. 6 is a plan view partly in section on the line 6—6 of Fig. 5;

Fig. 7 is a section on the line 7—7 of Fig. 5; and

Figure 1:
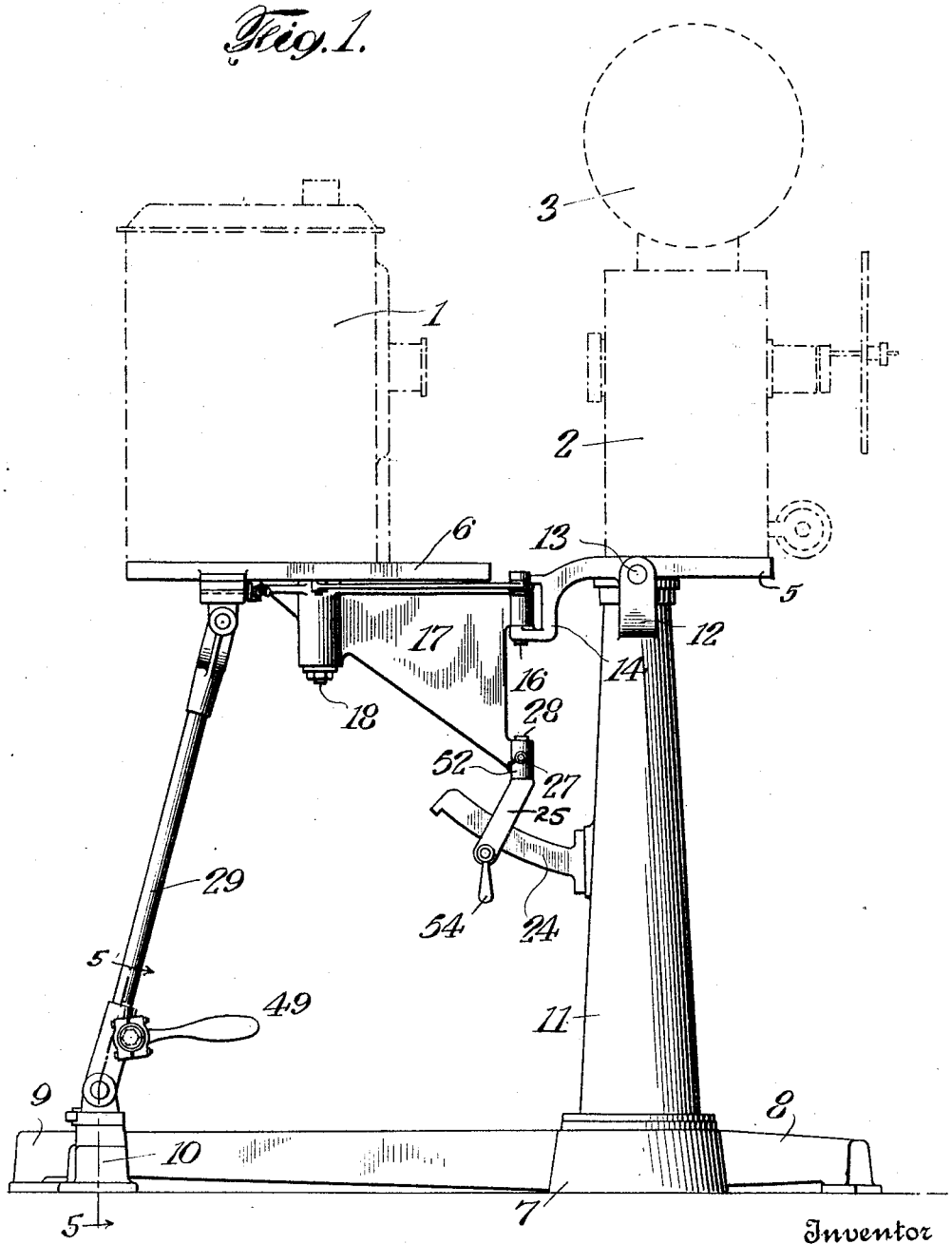

In the following description and in the claims parts will be identified by specific names for convenience, but they are intended to be as generic in their application to similar parts as the art will permit.

Like reference characters denote like parts in the several figures of the drawings.

In the drawings accompanying and forming part of this specification, practical commercial embodiments of the invention are shown, but as such illustrations are primarily for purposes of disclosure, it will be understood that the structure may be modified in various respects without departure from the broad spirit and scope of the invention as hereinafter defined and claimed.

Referring now to the drawings, and more particularly to Fig. 1, the lamp house enclosing the source of light is denoted by 1 and the projection head having the film-controlling apparatus is denoted by 2. Disposed above the projection head is the upper film magazine 3 and below the projection head may be the lower film magazine. The projection head 2 is mounted upon a support or plate 5 and the lamp house 1 is mounted upon another support or plate 6 suitably secured to the plate 5.

Figure 3:
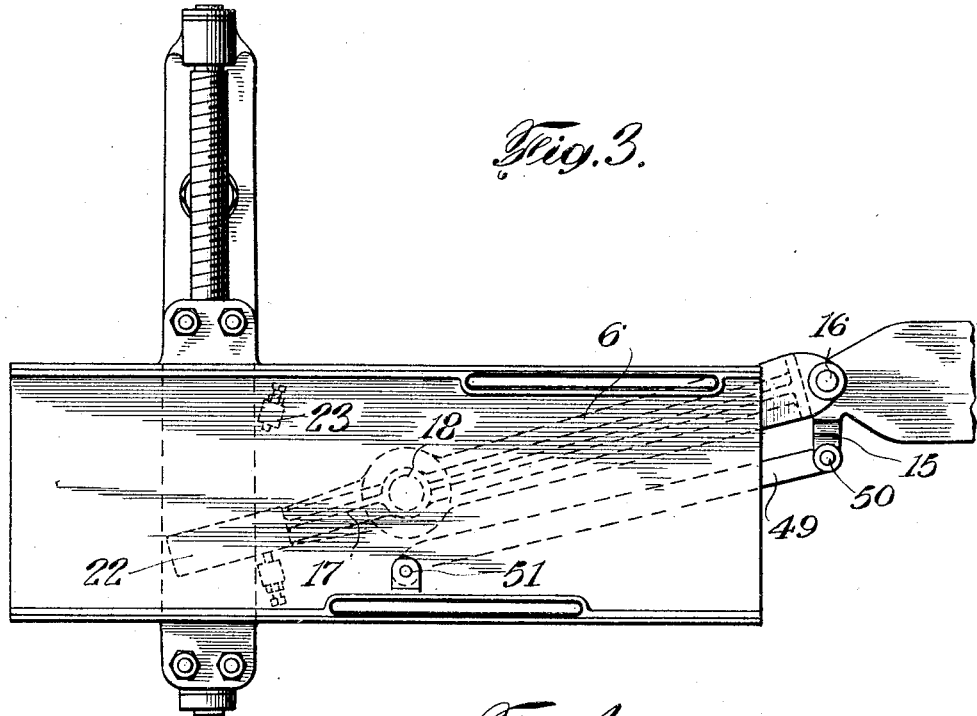
Fig. 3 is a detail of the mounting for the lamp house support.

The apparatus for mounting the picture projecting machine comprises a base 7 having at its forward end a pair of diverging feet 8 and at its rear end a back foot 9 and a pair of side feet 10. Near the front end a pedestal 11 is disposed having at its upper end a pair of lugs 12. Pivoted to the lugs 12 by pivot 13 is the plate or support 5 for supporting the projection head. The plate 5 has at its rear end a forked member 14 and a lateral projecting member 15 (Fig. 3) for a purpose hereinafter described.

Figure 4:
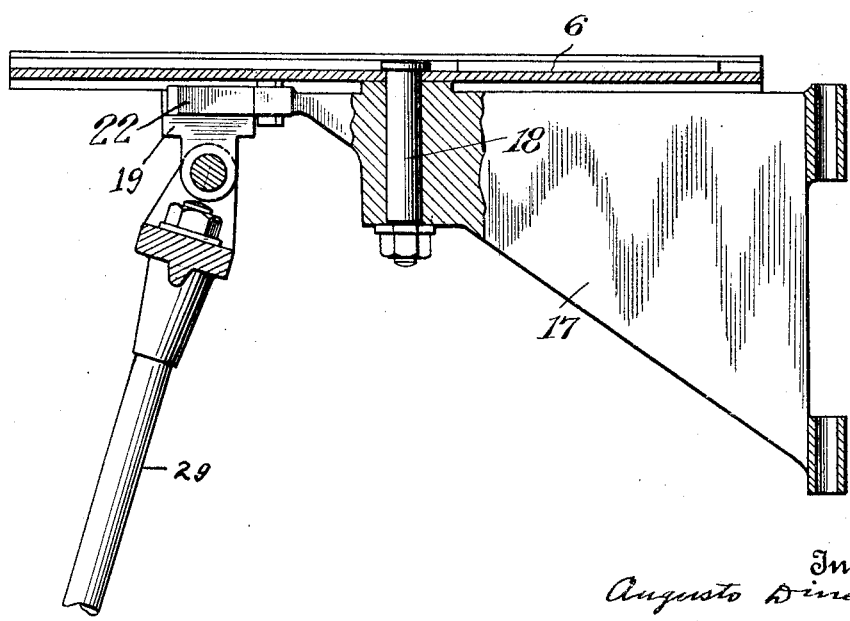
Fig. 4 is a side elevation partly in section of Fig. 3.

Pivoted to the fork 14 by a transverse pivot 16 perpendicular to pivot 13 is a triangular web-like member 17 having a pivot 18 to which the lamp house plate 6 is secured. The lamp house plate has secured thereto (Figs. 2, 3 and 4) a lower strap 19 forming a slot 20 therebetween. The strap 19 has depending lugs 55 and 56 which are mounted upon a rod 21. The web 17 is provided with a projecting tongue 22 which is slidably mounted in the slot 20 and the plate has adjustable stop members 23 for limiting the movement of the plate 6 as hereafter described. It will be seen that the web 17 may be rotated about the pivot 16.

In order to keep the axis of the lamp house 1 always parallel to the axis of the projection head 2 when the lamp house is shifted laterally for still pictures, a pantograph motion is used. A pantograph link 49 is pivotally connected to the lateral member 15 by pivot 50 and to the lamp house plate 6 by pivot 51. The pivots 16, 18, 50 and 51 form the corners of a parallelogram whose sides are the members 6, 17, 15 and 49. Thus it will be seen that when the plate 6 is moved laterally, the axis of the lamp house 1 remains parallel to itself, this being assured by the pantograph arrangement made up of the web 17, pantograph link 49, projection 15 and plate 6.

Referring back to Fig. 1, the pedestal 11 is provided with a sector or arcuate member 24 defining an arc of a circle whose center is the pivot 13. A clamping member 25 has a projecting pivot 28 disposed in a sleeve 52 secured to web 17. The pivot 28 is in line with pivot 16. A set screw 27 is provided for clamping the pivot 28 within the sleeve 52 when desired.

Figure 2:
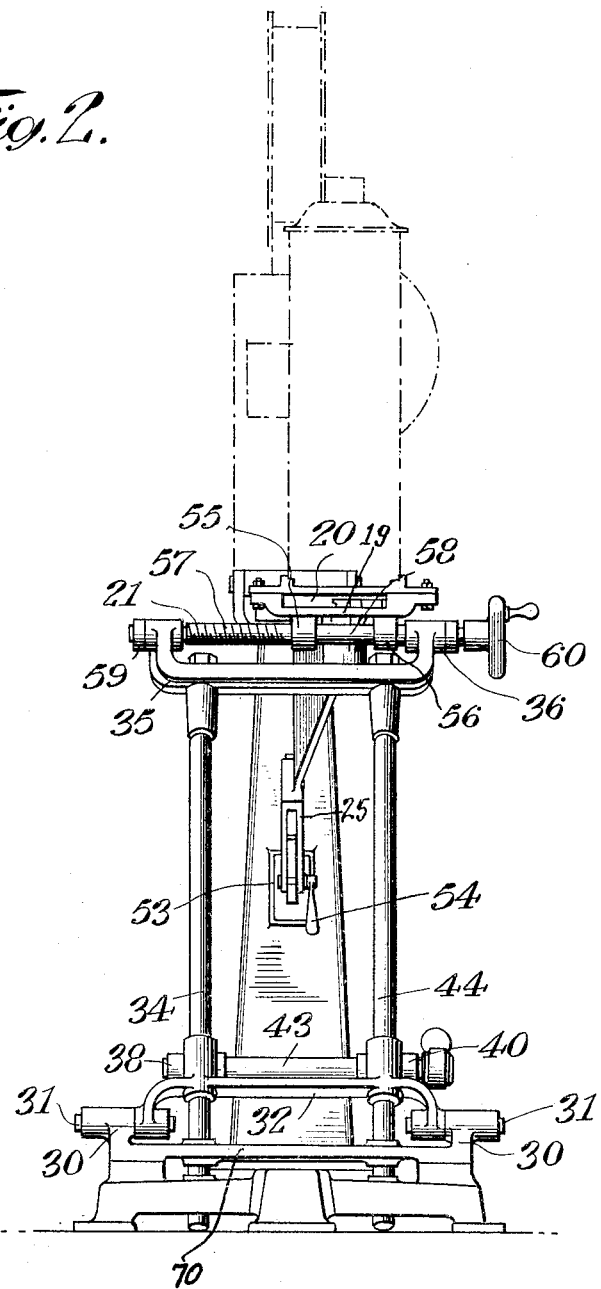
Fig. 2 is a rear view of the same.

The clamping member 25 may be bifurcated, its forks being disposed on opposite sides of the sector member 24, (see Fig. 2). A bolt 53 having a nut 54 in the form of a handle passes through the forks and, by rotating the handle 54, the clamping member 25 may be clamped at any position on the sector member 24.

After the parts are adjusted about the pivots 13 and 16 to obtain the desired position and angle of the lamp house 1 and projection head 2, the handle 54 may be rotated and the set screw 27 adjusted to clamp the parts in adjusted position. To steady or brace the mounting after it has been adjusted for use, a steadying or bracing arrangement is used.

The U-shaped member 35 (Fig. 2) is provided with hubs 36 in which the rod 21 is disposed. The rod 21 is provided with a screw threaded portion 57 and a smooth portion 58. The lug 55 is internally screw threaded and fits the screw threaded portion, and the lug 56 is internally smooth and slides on the smooth portion. The rod 21 is journalled in the hubs 36 on the U-shaped member 35, and collars 59 are fixed to the rod to hold it in proper axial position. The outer end of the rod is provided with a hand wheel 60 by means of which the rod may be rotated to move the plate 6 laterally and about the pivot 16.

Referring to Fig. 5, the rear side feet 10 have mounted thereon a U-shaped member 70 provided with a pair of upstanding lugs 30. Pivoted to these lugs by pivots 31 is a U-shaped member 32 having hub-like portions 33 and 39 (Fig. 5). Slidably disposed in these hubs are steadying or bracing rods 34 and 44 which are fastened at their upper ends to the upper U-shaped member 35. The feet 10 are provided with elongated openings 37 and the member 70 is also provided with elongated openings to allow movement of the steadying members 34 and 44, both lengthwise and about the pivots 31.

Due to the adjustment of the lamp house 1 about the pivots 16 and 18 a telescoping movement between the U-shaped member 32 and the bracing members 34 and 44 must take place. After the lamp house 1 and projection head 2 are adjusted, it is necessary to fix the relation between the U-shaped member 32 and the bracing members 34 and 44. This is done by means of a suitable clamping device hereinafter described.

Referring to Figs. 5 and 6, the hubs 33 and 39 are provided with offset transverse sleeves 38 and 40. Disposed in one sleeve 38 is a rod 43 having a recess to accommodate the bracing member 34. The rod 43 has a reduced stem 45 which is screw threaded at its end. Disposed within the sleeve 40 is an inner sleeve 46 slidably mounted upon the reduced stem 45 and having a recess to accommodate the bracing member 44. If necessary, the reduced stem 45 may also have a slight recess to clear the bracing member 44. Screw threaded on the stem 45 is a nut member 47 having preferably a hexagonal surface on which a strap 48 having a hexagonal bore is suitably clamped. The strap 48 has a handle 49. By rotating the handle 49 in the proper direction the sleeve 46 may be forced to the left, looking at Fig. 6, and the rod 43 to the right to exert a clamping action upon the bracing members 34 and 44.

When it is desired to use the machine for motion pictures, the lamp house 1 is moved about the pivot 16 until it is in line with the projection head 2. The plates 5 and 6 are then adjusted about the pivot 13 to center the projected picture upon the screen. The handles 49 and set screw 27 are then tightened to hold the parts rigidly.

When it is desired to use the machine for still pictures, set screw 27 and handle 49 are loosened and the web 17 is swung about the pivot 16 to a position where the line of projection from the lamp house 1 clears the projection head 2. The pantograph construction keeps the line of projection always parallel to itself. The slide tongue 22 and slide rod 21 allow this motion and, at the same time, keep the parts in close fitting mechanical relation.

Figure 8:
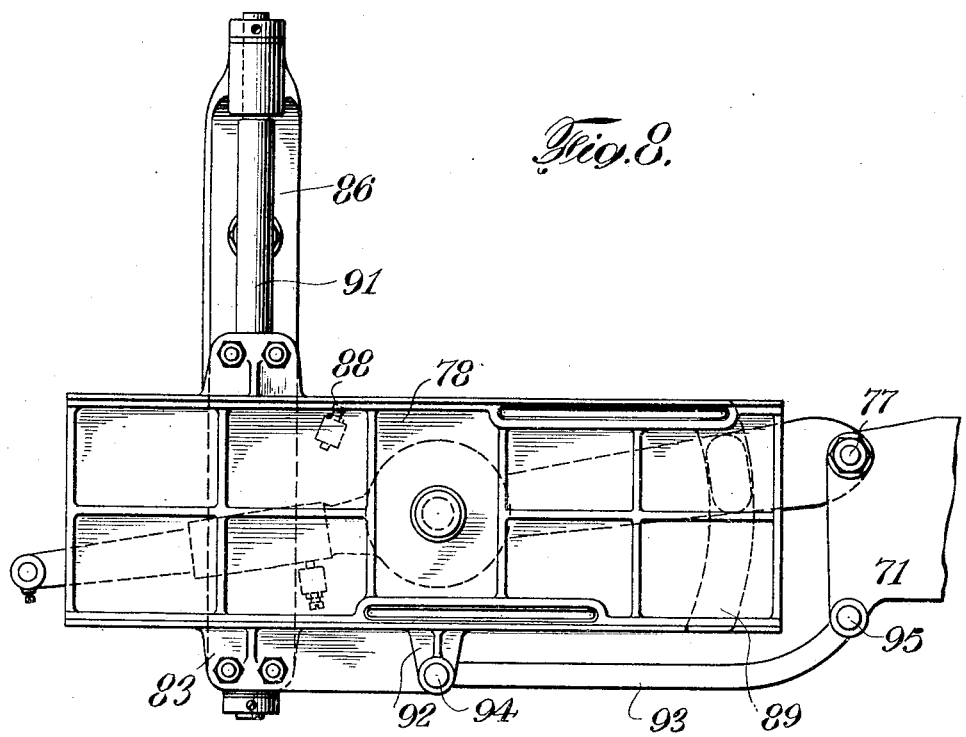
Figs. 8 and 9 are details corresponding to Figs. 3 and 4, of a modification.
Figure 9:
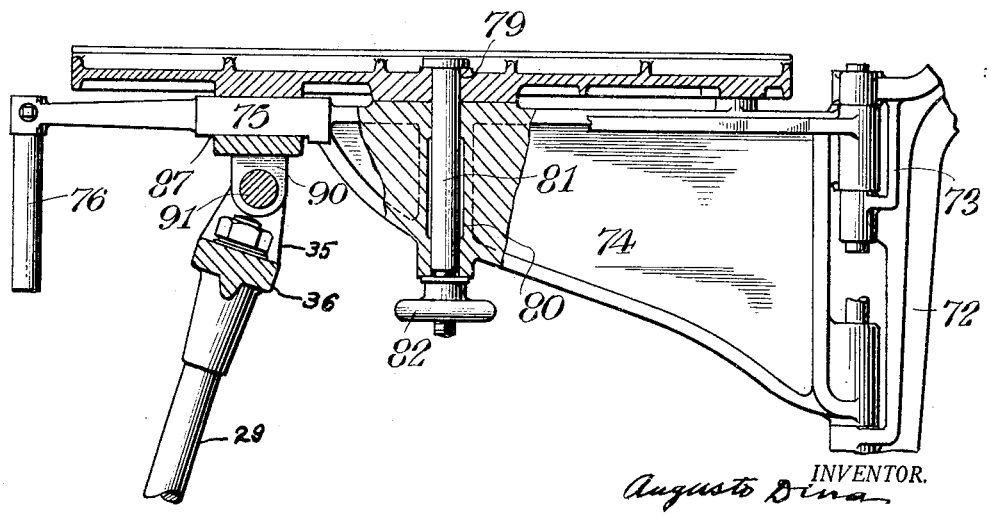

Referring now to Figs. 8 and 9 which show a modification, the front plate 71 is provided with a pair of large forks 72 and a pair of small forks 73 laterally offset therefrom by a substantial distance. Pivoted between the large forks is a web member 74 having a projecting bearing tongue 75 which in turn has projecting therefrom a depending handle 76. The pivot bolt (not shown) which connects the web and the lower fork may be part of the clamping member 25, if desired, as in Fig. 1. The pivot bolt connecting the web to the upper fork is denoted by 77.

The back plate 78 for supporting the lamp house rests on the web 74. This plate 78 is provided with suitable ribs and has an opening 79 aligned with an opening 80 in the web. A bolt 81 passes through the aligned openings, and a hand wheel 82 is threaded on the lower end of the bolt for clamping the plate 78 in any adjusted position.

The back plate 78 is provided with offset lugs 83 to which is suitably secured a depending strap 86 forming a slot 87 in which the tongue 75 slides. The back plate 78 is provided with adjustable set screw stops 88 to limit the motion of the tongue with respect to the plate. The plate 78 is also provided with a curved bearing surface 89 on its lower side for bearing against the top of the web. Also the web and plate are provided with bearing surfaces surrounding the aligned openings 79 and 80.

Depending from the strap 86 are lugs 90 having smooth holes in which is mounted a smooth rod 91. The bracing member 29 has a U-shaped member 35 at its upper end having hubs 36 in which the ends of the rod 91 are mounted.

The plate 78 is provided with an offset projection 92, and an auxiliary link 93 is pivoted by pivot bolts 94 and 95 to this projection and to the smaller fork 73 respectively. It will be seen that the members 71, 74, 78 and 93 form the sides of a parallelogram, providing a pantograph motion similar to that described above.

The operation of the device with this modification is substantially the same as described above. When it is desired to move the lamp house laterally for still pictures, the hand wheel 82 will be loosened and the lamp house may be moved quickly by grasping the handle 76 and throwing the handle over to any position desired or to a position limited by stop 88. Some of the advantages of this modification are the ease and quickness with which the lamp house may be moved, either to still picture or motion picture position and also the provision of positive clamping means in the form of the bolt 81 and hand wheel 82 for clamping the back plate and web together. The bearing surfaces between the web and back plate also contribute to the rigidity of the device when the hand wheel is in clamping position.

Thus a support for a motion picture machine is provided which is capable of easy adjustment to obtain the proper projection angle and also to shift the lamp house, and which is capable of being made extremely rigid after adjustment. The parts are so arranged that the axis of the lamp house must always be parallel to the axis of the projection head even though the lamp house is shifted laterally for the projection of still pictures. The arrangement is easy to operate and is not liable to get out of order.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In picture projection apparatus, a base member, a front support, means for pivoting said front support to said base member about a horizontal axis, a rear support, a connecting member, means pivoting said connecting member to said front and rear supports about axes perpendicular to said horizontal axis, a bracing member, means pivotally connecting said bracing member and said base member, means for connecting said bracing member and said rear support to allow relative pivotal and sliding movement therebetween.

2. Mounting for picture projection apparatus comprising a base, a front support, means pivotally connecting said front support to said base, a rear support, spaced connecting members, means for pivotally connecting said connecting members respectively to said front and rear supports, a bracing member, means for pivotally connecting said bracing member and base, means for pivotally and relatively slidably connecting said bracing member and rear support, and means for adjusting the parts and clamping them in adjusted position.

3. Mounting for picture projection apparatus comprising a base having a pedestal, a front support pivoted to said pedestal about a horizontal axis, a supporting member pivoted to said front support about an axis perpendicular to said horizontal axis, a rear support pivoted to said member about an axis perpendicular to said horizontal axis, said rear support having a seat, a rod on which said seat is adjustably mounted, an adjusting device secured to said pedestal and to said member, an auxiliary bar pivoted to said front and rear supports about axes perpendicular to said horizontal axis, a bracing member pivoted to the rear end of said base about a horizontal axis and secured to said rod, said bracing member having adjustable, relatively slidable parts.

4. Mounting for picture projection apparatus comprising a base having a pedestal, a front support pivoted to said pedestal about a horizontal axis, a supporting member pivoted to said front support about an axis perpendicular to said horizontal axis, a rear support pivoted to said member about an axis perpendicular to said horizontal axis, said rear support having an internally threaded portion, a screw threaded rod on which said portion is mounted, an adjusting device secured to said pedestal and to said member, an auxiliary bar pivoted to said front and rear supports about axes perpendicular to said horizontal axis, a bracing member pivoted to said base and to said rod about horizontal axes, said bracing member having adjustable, relatively slidable parts, and means for rotating said rod.

5. Mounting for picture projection apparatus comprising a base having a pedestal, a projection head support pivoted to the top of said pedestal about a horizontal axis, a supporting web pivoted to the rear end of said support about an axis perpendicular to said horizontal axis, a lamp house support pivoted to the rear end of web about an axis perpendicular to said horizontal axis, said lamp house support having a horizontal slot and a depending internally threaded lug, said web having a tongue slidable in said slot, a threaded rod on which said lug is mounted, an arcuate member secured to said pedestal, a clamping member pivoted to said web about an axis perpendicular to said horizontal axis and slidable and clampable on said arcuate member, the rear end of said projection head support having a lateral projection, an auxiliary bar pivoted to said lateral projection and lamp house support about axes perpendicular to said horizontal axis, a bracing member pivoted to the rear end of said base and to said rod about a horizontal axis, said bracing member having clampable telescoping parts, and a hand wheel on said rod.

6. Mounting for projection apparatus comprising a base, a support for said apparatus, a member pivoted to said base, said member having upstanding hubs, said hubs having offset transverse sleeves, bracing rods telescoping within said hubs, means for securing said rods to said support, a clamp bar having an abutment adapted to engage one of said bracing rods, a clamp sleeve having an abutment adapted to engage the other bracing rod, said bar having a reduced stem on which said clamp sleeve is disposed, said bar and clamp sleeve being disposed in said transverse sleeves, a nut member threaded on said reduced stem, and means for rotating said nut member to clamp said bracing rods.

7. Mounting for projection apparatus comprising a lamp house support having depending lugs, means for moving said support in three directions, a base having upstanding lugs, a U-member pivoted between said lugs, said member having upstanding hubs, said hubs having offset transverse sleeves, a rod disposed in said depending lugs, an upper U-member secured to said rod, bracing members secured to said upper U-member and telescoping within said hubs, a clamp bar having a recess accommodating one of said bracing members, a clamp sleeve having a recess accommodating the other bracing member, said rod having a reduced stem on which said clamp sleeve is disposed, said bar and clamp sleeve being disposed in said transverse sleeves, a nut member threaded on said reduced stem, and means for rotating said nut member to clamp said bracing members.

8. Picture projection apparatus comprising a base member, a projection head support pivoted to said base member, a connecting member pivoted to said support, a lamp house support pivoted to said connecting member, means for clamping said lamp house support to said connecting member in adjusted position, a transverse rod, means for slidably seating said lamp house support on said rod, and a bracing member connecting said base and rod.

9. A mounting for picture projection apparatus comprising a base having a pedestal, a projection head support pivoted to said pedestal about a horizontal axis, a supporting web pivoted to said support about an axis perpendicular to said horizontal axis, said web having a projecting tongue and an outer depending handle, a lamp house support on said web, said lamp house support and web having aligned openings, a bolt in said openings, a hand wheel on the lower side of said bolt, a strap depending from said lamp house support forming a slot for said tongue, said strap having depending lugs with smooth holes, a smooth rod on which said lugs are mounted, a brace pivoted to the rear end of said base and having a U-shaped member pivoted to said rod, means for varying the length of said brace, an adjusting device between said projection head support and pedestal, said lamp house support having spaced bearing portions on said web, and an auxiliary bar pivoted to said lamp house and projection head supports respectively.

10. A mounting for picture projection apparatus comprising a base having a pedestal, a projection head support pivoted to said pedestal about a horizontal axis, a supporting web pivoted to said support about an axis perpendicular to said horizontal axis, said web having a projecting tongue and an outer handle, a lamp house support on said web, said lamp house support and web having aligned openings, a bolt in said openings, a hand wheel on the lower side of said bolt, said lamp house support having a slot for said tongue, a brace pivoted to the rear end of said base and holding a smooth rod, said lamp house support having a seat for sliding movement of said rod, means for varying the length of said brace, an adjusting device between said projection head support and pedestal, and an auxiliary bar pivoted to said lamp house and projection head supports.

AUGUSTO DINA.